United States Patent

[11] 3,623,976

| | | |
|---|---|---|
| [72] | Inventor | Joseph O. Cessna<br>Modesto, Calif. |
| [21] | Appl. No. | 872,515 |
| [22] | Filed | Oct. 30, 1969 |
| [45] | Patented | Nov. 30, 1971 |
| [73] | Assignee | Del-Pak Media Corporation |

[54] LIQUID WASTES TREATMENT METHOD
5 Claims, 2 Drawing Figs.

[52] U.S. Cl. ............................................. 210/7,
210/5, 210/8, 210/17, 210/151, 210/195
[51] Int. Cl. ............................................. C02c 1/04
[50] Field of Search ............................................. 210/15, 17,
2, 3–9, 150, 151, 195–197

[56] References Cited
UNITED STATES PATENTS

| | | | |
|---|---|---|---|
| 2,168,208 | 8/1939 | Jenks | 210/151 |
| 2,340,848 | 2/1944 | Reybold et al. | 210/151 |
| 2,366,917 | 1/1945 | Levine | 210/17 |
| 3,112,261 | 11/1963 | Porter et al. | 210/17 |
| 3,143,498 | 8/1964 | Fordyce et al. | 210/151 X |
| 3,231,490 | 1/1966 | Fry | 210/17 |
| 3,261,779 | 7/1966 | Sullins et al. | 210/17 X |

OTHER REFERENCES

Hurwitz, E. et al., Performance of Surface Aerators Under Widely Varying Loadings in an Activated Sludge System, W & S.W., Reference Number, 1965, Vol. 112, pp. R–209 thru R–212, R–214 thru R–216 and R–218. (Copy in GP. 176)

*Primary Examiner*—Michael Rogers
*Attorney*—Warren, Rubin, Brucker & Chickering ABSTRACT: A liquid wastes treatment system, including a two-stage, high-rate, activated, biological filter is disclosed. An activated floc, similar to that found in activated sludge processes, is built up in the biological filter by recycling substantial quantities of aerobic sludge from a secondary clarifier to the biological filter and by metering the solids wasted from the treatment system to maintain the mixed liquor, suspended solids level in the filter effluent in excess of about 1,500 mg./l. Underdrain flow from the secondary clarifier is a substantial percentage of plant influent flow and is recycled without extended mixing with plant influent or aeration prior to distribution over the biological filter. The filter media is preferably an array of lathes formed to provide many horizontal surfaces on which floc will form. When a two-stage system is employed, including a primary clarifier, wasting is preferably accomplished by returning activated floc and biological slime sloughed from the biological filter to the primary clarifier and wasting solids from the primary clarifier, which also results in improved primary clarification.

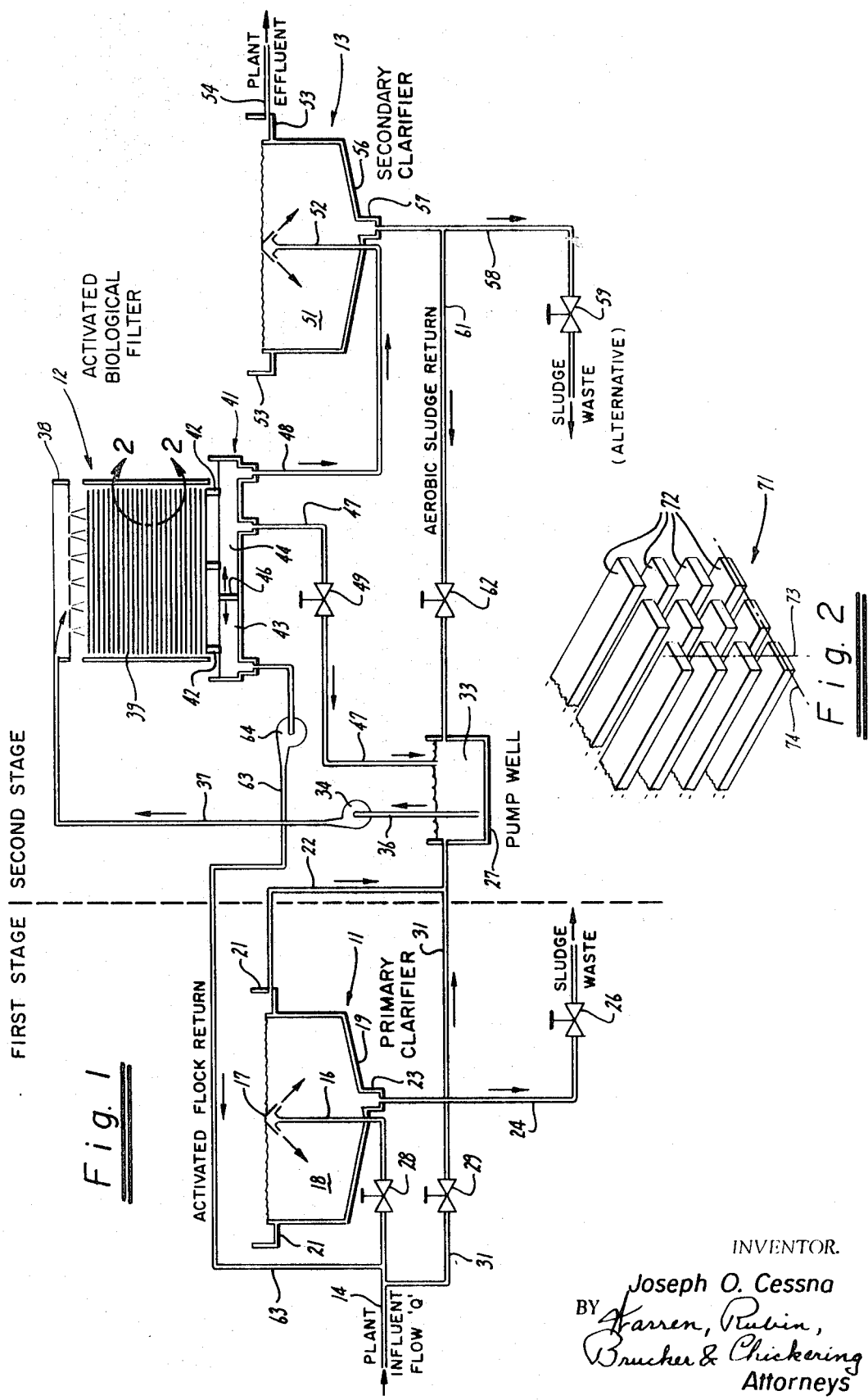

LIQUID WASTES TREATMENT METHOD

BACKGROUND OF THE INVENTION

In the treatment of liquid wastes, including industrial and domestic wastes, a number of treatment processes have been evolved which employ, as the primary treating apparatus, a trickling filter, activated sludge basin or a combination thereof. These processes also usually include the use of clarifiers, holding tanks, screening equipment and the like.

One prior system which has been in widespread use has been the activated sludge plant in which oxygen is mechanically brought into contact with the liquid wastes in a basin or tank through the use of such devices as diffusers at the bottom of the tank or churning devices such as propellers. This process is satisfactory in many respects and produces what is known as an activated sludge or flocculent material resulting from biological and chemical processes taking place in the activated sludge tank. The activated sludge may then be clarified with unoxidized solids being wasted to a digester or similar apparatus. One of the substantial drawbacks of activated sludge processes is the power requirements which are involved in churning or diffusing air or oxygen into the liquid waste in order to effect treatment thereof. Another problem which has been commonly encountered with the use of activated sludge plants is that loss of solids from the system, sometimes caused through shock loading, may result in failure of the process. When the activated sludge tank or basin experiences a loss of solids, usually as a result of bulking (failure of solids to settle), it begins acting merely as a clarifier instead of producing an activated sludge or floc. Thus, the BOD removal in activated sludge systems subjected to shock loading can drop drastically. Moreover, and very importantly, solids are also passed out of the system in the plant effluent, and as long as a week may be required to build solids in the system and bring the plant up to normal operation. Accordingly, while the activated sludge plant often is an effective means of liquid waste treatment, it is not always the most stable or economical method of treatment.

The use of low and high rate trickling filters as a sewage treatment apparatus is also widespread. Trickling filters, which are in fact habitats for biological growth rather than being filters, may be constructed of a variety of media. The media in most widespread use is rock; however, rock-filled biological filters have been found to have several defects. Accordingly, other filter media have been employed including plastic media composed primarily of vertically oriented surfaces and wooden media composed primarily of horizontally oriented surfaces. A typical trickling filter process, regardless of the media used, might be a two-stage treatment plant including a primary clarifier, a biological filter and a secondary clarifier. Usually in such a treatment system there is a certain recycling of liquid wastes which occurs as a part of the treatment process. For example, part of the effluent from the biological filter will be directly recycled over the filter again in order to insure that the hydraulic loading of the filter is relatively uniform and sufficient to ensure proper biological growth on the filter surfaces. Another technique which has been used is to recycle settled or substantially anaerobic sludge from the secondary clarifier over the biological filter, usually at a low rate and for a large number of cycles over a long period of time. This approach is sometimes described as "extended aeration" in that the solids settled in the secondary clarifier are attempted to be completely oxidized on the biological filter. This process essentially eliminates the need of wasting solids from the plant by oxidizing them. Such an approach cannot be employed in many instances since it may result in plugging or ponding of the biological filter by inducing too heavy a loading thereon or in bulking of the final clarifier or excessive time and cost in oxidizing the solids.

Still another approach has been to combine an activated sludge plant with a biological filter. This type of system normally employs the biological filter as an aerator in order to allow further oxidation of solids in the mixed liquor from the activated sludge process by cycling the mixed liquor over the filter. This is another form of extended aeration. In this combined treatment process, activated floc is created in the activated sludge basin and then further oxidized in the aerator.

A further hybrid sewage treatment system has been employed and approximates the combination of an activated sludge plant with an aeration device. In this hybrid system, a biological filter is used together with a final clarifier. Settled substantially aerobic sludge is withdrawn from the final clarifier and placed in a detention apparatus, such as a spiral-vortex mixing tank, until the settled sludges become aerated by exposure to oxygen in the tank. After a substantial detention time in the spiral-vortex tank, the aerated sludges may then be distributed over the biological filter. This process, while satisfactory in some respects, requires a substantial detention time to treat the sewage. Moreover, and importantly, it results in considerably more cost in terms of power requirements to operate the spiral-vortex tank and cost of installing the spiral-vortex apparatus and real estate on which it must be constructed.

Accordingly, it is an object of the present invention to provide a method of treating liquid wastes wherein a biological filter may be employed and an activated floc created in the filter without the need of an extended detention time in an aeration basin or tank to thereby improve filter efficiency and loading capacity.

Another object of the present invention is to provide a liquid wastes treatment system in which improved clarification and wasting of solids can be accomplished.

Another object of the present invention is to provide a method for treatment of liquid wastes in which the cost of treatment per unit volume, both in terms of apparatus and power required, is minimized.

Still another object of the method of the present invention is to provide a liquid wastes treatment process wherein removal of wastes is comparable to that achieved through the use of an activated sludge plant.

Another object of the present invention is to provide a liquid wastes treatment process which can withstand shock loading and does not fail upon loss of solids from the treatment system.

SUMMARY OF THE INVENTION

The liquid wastes treatment system of the present invention, briefly, is comprised of a biological filter formed to allow heavy biochemical oxygen demand loading and means to recycle substantial quantities of aerobic sludge from a secondary clarifier for distribution over the biological filter, without detaining the sludge for aeration, to cause an activated floc to be created in the filter. Wastes in the treatment system are metered to maintain the mixed liquor, suspended solids level in the filter effluent in excess of about 1,500 mg./l. Loss of solids below this level, however, merely causes the system to act as a trickling filter and does not result in failure of the treatment process. Underdrain flow from the secondary clarifier is preferably greater than 10 percent of the plant influent flow. The filter media is preferably an array of elongated lathes formed to provide a multiplicity of horizontally oriented surfaces on which activated floc will form. When a two-stage system is employed, including a primary clarifier, wasting is preferably accomplished by returning activated floc sloughed from the activated biological filter to the primary clarifier, which also results in improved primary clarification. Recycling filter effluent also may be employed in the present system to maintain hydraulic loading.

BRIEF DESCRIPTION OF THE DRAWING

FIG. 1 is a schematic, side elevational representation of a two-stage, liquid wastes treatment system constructed in accordance with the present invention.

FIG. 2 is an enlarged, fragmentary, prospective view of filter media suitable for use in the process of the present invention.

DESCRIPTION OF THE PREFERRED EMBODIMENTS

Referring now to FIG. 1, there is illustrated a two-stage liquid wastes treatment system which includes a primary clarifier, generally designated 11, a biological filter, generally designated 12, and a secondary or final clarifier, generally designated 13. Liquid wastes enter the fluid treatment system through influent conveying means 14, usually a conduit, and are distributed in primary clarifier 11 through pipe 16. Mounted on pipe 16 is a distribution head 17 which imparts a downward and outward flow to the plant influent into the liquid wastes 18 contained in clarifier 11. The clarifier may be formed in a standard manner and is here represented as a cylindrical tank having a conical bottom 19 and launder 21 into which overflow from the clarifier flows. In the primary clarifier solids tend to settle into the conical base 19, and primary clarifier effluent flows over a weir into launder 21 and into clarifier effluent conduit 22. Settled solids or sludge can be removed or wasted from the sewage treatment system by withdrawing the solids from a collection basin 23 through waste conduit 24. Most clarifiers are provided with rakes which move the partially settled solids to collection basin 23. The primary and secondary clarifiers used in the process of the present invention are preferably provided with such raking apparatus, but the same is not here illustrated for the purpose of simplicity. Flow of sludge from the primary clarifier is controlled by valve 26 so that the solids in the primary clarifier can go to a digester, an aerator or oxidizer, or sludge beds, or any other apparatus which is commonly employed in the disposal of solid wastes from sewage treatment plants. This portion of the sewage treatment process of the present invention has commonly been employed in other sewage treatment processes and essentially comprises the first stage of a two-stage treatment system.

In some sewage treatment systems, the primary clarifier or first stage may be eliminated. This approach may also be used with the process of the present invention. If the first stage is eliminated, flow of plant influent, after screening to remove large objects, would essentially go directly to pump well 27. For purposes of illustration, this may be accomplished by closing valve 28 and opening valve 29 to allow flow through conduit 31. As a practical matter, most treatment systems are either set up to operate with a primary clarifier or without, and a bypass conduit 31 to a primary clarifier is usually not provided. Bypass 31 is set forth herein merely to better illustrate the flow of liquid wastes into a sewage treatment system in which the primary clarification stage is eliminated.

Primary clarifier effluent from conduit 22 or plant influent from conduit 31 enters pump well 27 where it is stored as a body of liquid wastes 33. Wastes 33 are in pump well 27 for a very short period of time, on the order of a few minutes, during which they mix with other flows introduced into pump well 27, as will be explained more fully hereinafter. Pump 34 withdraws the wastes from pump well 27 through conduit 36 and conveys them through conduit 37 to distribution means 38. Distribution means 38 may take any one of a number of forms including rotary arms, notched weirs, and overhead splash plate sprinkling systems. The function of the distribution system is to deposit wastes from the pump well relatively uniformly over the upper surface of the biological filter.

An important aspect of the process of the present invention is that it provides for the production of an activated floc without the necessity of retaining the liquid wastes in a detention means for a substantial period of time to aerate the waste and/or produce floc prior to distribution over the filter. This is accomplished through the use of a filter media which is constructed to provide a habitat which will allow the formation of an activated floc or sludge in the filter. As was set forth hereinabove, biological filters have been formed in a number of different manners including the use of various kinds of configurations of filter media. In the process of the present invention, the filter media must be capable of being heavily loaded with solids in order to produce the desired floc. Accordingly, rock media which is commonly employed, is unsuitable for the process of the present invention since heavy loading with solids will result in growth of biological slimes which will plug and pond the media. In order to provide an activated biological filter, that is, a filter in which activated biological floc is produced, it is necessary that the filter media not be subject to ponding or clogging by the floc.

One form of filter media which has been found to be very advantageously employed in the process of the present invention is illustrated in FIG. 2 and is comprised of a lath gridlike array 71 of horizontal surfaces 72 which are roughened or irregular in order to provide a favorable habitat for the growth of biological slimes and the formation of activated floc. It has been found that these lath surfaces can be advantageously formed of redwood to give the desired texture and erosion resistant properties. Such a filter media structure and configuration is more fully described in copending application, Ser. No. 756,345, now U.S. Pat. No. 3,496,101, which is owned by the assignee of the present application. While this filter media has previously been found to be advantageously employed as a trickling filter, it is also well suited for use as an activated biological filter in order to produce activated floc. The lathes are preferably arranged in a square array, that is, with vertically and horizontally aligned rows of lathes 73 and 74, respectively. Vertically adjacent lath members are in vertical alignment and horizontally adjacent members are in horizontal alignment. This configuration is described in more detail in the aforementioned application and allows slimes and floc to be sloughed from the filter. As will be understood, however, other filter media might be employed which will allow the heavy loading of solids and the production and periodic sloughing of an activated floc.

Flow of the sewage wastes over filter media 39 and activated biological filter 12 proceeds down by gravity to a collecting means, generally designated 41. The filter media 39 is supported by members 42 which allow filter effluent to pass from the filter. Collecting means 41 consists of a filter effluent channel divided into two basins 43 and 44 for the proportional distribution of effluent from the filter. Effluent which flows into basin 44 of the filter effluent channel will be withdrawn from the channel through conduit means 47 and 48. Conduit 47 is controlled by valve 49 and returns filter effluent to pump well 27 for recycling over the filter. This effluent return has been employed in prior filters to maintain hydraulic loading and is also advantageously employed in the activated biological filter process of the present invention.

Filter effluent withdrawn through conduit 48 passes to final clarifier 13, with the filter effluent being distributed into the liquids 51 contained in the clarifier by means of pipe 52. Mounted on clarifier 13 is launder 53, which is connected to a conduit 54 in order to convey effluent from the secondary clarifier. In this instance, secondary clarifier effluent is the plant effluent. Plant effluent may be treated through any one of a number of tertiary treatment techniques which are presently employed, for example, the use of sand filters or lagoons, and may include the addition of chemicals. From the tertiary treatment stage, or directly from launder 53, the effluent may flow into a body of water or water course.

As was described in connection with the primary clarifier, solids in the secondary clarifier which are settleable, will begin to settle into the conical portion 56 of the secondary clarifier and be raked into catch basin 57. In prior art sewage treatment systems, it has been common to remove sludge from the secondary clarifier, as, for example, through conduit 58, as controlled by valve 59. The amount wasted is usually relatively small, on the order of 2 percent of the flow rate of the plant influent or less. This technique of wasting solids from the liquid wastes which are being treated can be used in the process of the present invention if the primary clarifier is eliminated. In such a process it would be preferable to provide a sludge thickener to reduce the hydraulic load on the wasting apparatus. It is preferable, however, as will be described hereinafter, to waste solids from the process of the present invention by returning them to the primary clarifier for wasting from the plant through conduit 24.

In any event and whether or not waste occurs through conduit 58 or through conduit 24, it is a feature of the process of the present invention to withdraw unsettled, aerobic sludge from the secondary clarifier through conduit 61 to pump well 27. The flow from catch basin or underdrain 57 through conduit 61 is metered by valve 62 in order to maintain the flow of the sludge from the secondary clarifier at a sufficient volume to prevent the sludge from settling to the point of being anaerobic or septic. The flow rate of aerobic sludge, in order to prevent anaerobic conditions in the secondary clarifier, is normally on the order of at least about 10 percent to 20 percent of the plant influent flow (hereinafter referred to as "Q") or greater. It has been found that recycling of aerobic sludge to pump well 27 and immediate redistribution of the aerobic sludge over the filter, together with plant influent, results in the creation of an activated floc and a high reduction of BOD in the liquid wastes passed over the filter. This process is contrary to the prevailing theory that activated sludge or floc can be produced only after substantial detention time of the wastes in a diffuser tank or aeration basin.

It has been hypothesized that the treatment capacity of the present system results, in large part, from a buildup of activated floc, not in suspension in the liquid wastes in the filter, on the upper horizontal surfaces of media of the type illustrated in FIG. 2. This buildup causes a buildup in solids in the filter which, it is further hypothesized, has the effect of reducing the detention time required to treat a given volume of wastes by increasing the contact efficiency between the liquid wastes, biological growths and oxygen. Accordingly, the effective detention time is greater than the actual detention time, which is merely the length of time for the wastes to pass through the filter.

It has also been found highly desirable in the process of the present invention to waste solids from the system or plant by recycling solids from the secondary clarifier over the filter, and then bleed a portion of the filter effluent, namely the effluent collected in basin 43, and pump the same through conduit 63 by means of pump 64 to the primary clarifier 11. This is preferably accomplished by merely having conduit 63 open into influent conduit 14. Accordingly, solids from the second stage can be recycled over the filter and then deposited in the first stage clarifier, to be wasted therefrom through conduit 24. This wasting technique has the highly desirable result of significantly improving the primary clarification. Thus, the creation of activated biological sludge on the filter by recycling unsettled sludge from the secondary clarifier and returning a portion of the activated floc or sludge which sloughs off in the filter effluent to the primary clarifier results in very efficient operation of the primary clarifier.

As will be understood, other hydraulic designs can be adopted which may obviate the need of pump 64 or pump 34 or which may require additional pumping. The system should be hydraulically designed to minimize pumping and therefore power requirements.

The process of the present invention further provides a sewage treatment system which is highly resistant to shock loading, secondary clarifier failure, and premature wasting of solids from the system. In order to form an activated floc in the activated biological filter, the mixed liquor, suspended solids level of the filter effluent should be maintained above 1,500 mg./l. Best results have been obtained when the mixed liquor, suspended solids level is between about 1,500 to about 6,000 mg./l., although even higher levels may be advantageous in certain applications. In the process of the present invention, however, loss of solids and, accordingly, a drop of the mixed liquor, suspended solids level below 1,500 mg./l. will not result in failure of the system. As was above noted in the case of activated sludge plants employing oxygen diffusing tanks or basins, shock loading may cause formation of a bulking sludge and passage of solids from the sewage treatment system in the plant effluent. This in turn, in the activated sludge plant, reduces the mixed liquor, suspended solids level low enough to stop the formation of activated sludge. Therefore, the diffusion basin no longer functions to generate activated sludge, and the BOD removal drops drastically, for example, from a 90 percent BOD removal to a 15 percent BOD removal, as the settling basin looses the activated solids. Replenishing the activated solids in the aeration basin may take 3 days to a week. By contrast, while the process of the present invention requires a mixed liquor, suspended solids level of at least about 1,500 mg./l., failure to maintain the solids level in the sewage treatment system at or above this figure does not result in failure of the sewage treatment apparatus. This is true because reduction of the mixed liquor, suspended solids to a point substantially below 1,500 mg./l. causes the activated biological filter to start functioning as a trickling filter. As a trickling filter, the reduction of BOD will be decreased over that achievable as an activated biological filter; however, the decrease in the percentage of BOD removal will be far less, for example, a reduction from 90 percent removal to 70 percent removal. Therefore, in the process of the present invention, a shock load, to the extent it does cause loss of solids from the system, would in the worst instance only reduce the process from an activated biological filter to a trickling filter process. Similarly, inadvertent excess wasting of solids from the secondary clarifier, and accordingly, the system might drive the mixed liquor, suspended solids level below that required to create an activated biological sludge, but the plant would still function as a trickling filter giving BOD removals which are quite adequate.

EXAMPLES

Single Stage Process

The operation of an activated biological filter (ABF), with filter media constructed in accordance with FIG. 2 and previously referred to copending application, Ser. No. 756,345, and the functioning of a rock-fill trickling filter were compared for 3½ months. The wastes treated were combinations of domestic and cannery wastes, with the cannery wastes becoming quite heavy during portions of the test period. The influent strength to both the activated biological filter and the trickling filter were the same, although the total flow over the trickling filter was much greater since the trickling filter was much larger. The activated biological filter was set up with a flow rate of recycled unsettled sludge from the secondary clarifier equal to approximately 0.05Q and the filter effluent recycled through conduit 47 was recycled at a flow rate of about 0.5Q to about 2.0Q. Table 1 sets forth the average values of measurements taken at least 5 days out of each week in the respective months. BOD values are 5-day BODS. In analyzing the results, it is important to note that the test data indicated that the BOD removal through the activated biological filter was substantially equal to or greater than the BOD removal achieved in the rock filter, and more importantly, a comparison of the load factors for the rock trickling filter indicates that the activated biological filter achieved substantially the same BOD reduction under a loading which ranges from three to five times as much as the loading of the rock trickling filter. Accordingly, the process of the present invention can be seen to result in a very substantial improvement in the loading capabilities of the sewage treatment process as a function of the unit volume of the media employed. As will be understood, such an increase in the load factor capability dramatically decreases the cost of operation of a plant by enabling essentially the same reduction through the use of much more compact apparatus.

TABLE 1

|  | July | | August | | September | | October (1-10) | |
| --- | --- | --- | --- | --- | --- | --- | --- | --- |
|  | ABF | ROCK | ABF | ROCK | ABF | ROCK | ABF | ROCK |
| Plant influent, Q (million gallons/day) | 0.114 | 5.52 | 0.125 | 5.338 | 0.130 | 4.82 | 0.130 | 6.50 |
| Influent BOD (primary effluent-mg./l.) | 248 | 248 | 402 | 402 | 234 | 234 | 123 | 123 |
| Filter effluent BOD (mg./l.) | 52 | 66 | 96 | 76 | 35 | 49 | 15 | 34 |
| BOD removal (percent) | 79.0 | 73.4 | 76.2 | 81.8 | 85.2 | 79.1 | 87.5 | 72.0 |
| Load factor* (lbs. BOD/1,000 ft.$^3$ media/day) | 120.7 | 35.3 | 204.8 | 58.2 | 134.4 | 29.6 | 70.7 | 20.8 |
| BOD removed (lbs. BOD/1,000 ft.$^3$ media/day) | 95.5 | 25.9 | 156.5 | 47.0 | 114.7 | 23.5 | 61.8 | 15.0 |
| Mixed liquor, suspended solids (mg./l.) | 4,284 | | 5,160 | | 4,797 | | 3,750 | |
| Nature of wastes | Domestic, beets, cherries, beans | | Domestic, beans, plums, corn | | Domestic, beets, onions, corn | | Domestic and some onions | |

*The load factor for the A.B.F., activated biological filter process was twice the load factor which can be achieved by using plastic vertical surface media operating as a trickling filter having 27 square feet of surface area per cubic foot of volume. Comparison with plastic media is based upon published data by manufacturers for the same BOD loading and the same BOD percentage removal.

Two-stage Process

By way of demonstration of the high efficiency of the process of the present invention and the improved primary clarification which may also be achieved, a two-stage liquid waste treatment process functioning, as is schematically illustrated in FIG. 1, was operated. In addition, plant effluent was directed through a tertiary treatment stage which consisted of mixed media filtration (a sand filter). The underdrain flow from the secondary clarifier was about 0.8Q to 1.3Q and the recycled filter effluent flow rate was about 2.0Q. The flow rate of the activated floc return to conduit 63 was about 0.03Q. Wasting from the plant through conduit 24 from the primary clarifier was as required. Data from operations was randomly sampled on 10 days during a 2-month period and averages of the data collected are set forth in table 2. As will be seen, 5-day BOD removal in the primary clarifier averaged 64.8 percent. BOD removal in a combination of the first and second stage was about 91.5 percent. When combined with tertiary treatment of mixed media filtration, the 5-day BOD removal averaged 96.8 percent.

Table 2

| Influent BOD (mg./l.) | 243 |
| --- | --- |
| Pounds BOD per Day | 1,745 |
| Primary Effluent BOD (mg./l.) | 85.5 |
| BOD Removed in Primary (%) | 64.8 |
| Secondary Effluent BOD (mg./l.) | 20.7 |
| BOD Removed-Primary and Secondary (%) | 91.5 |
| Tertiary Effluent BOD | 7.8 |
| BOD Removed—Total Plant (%) | 96.8 |

I claim:

1. A liquid wastes treatment process comprising the steps of:
    a. employing a biological filter formed with surfaces on which biological slimes can grow on passage of liquid wastes thereover, said surfaces being formed to support and retain substantial quantities of biological slimes, to allow periodic sloughing of biological slimes from said filter, and to provide aeration of said liquid wastes and said biological slimes under heavy biological slime growth conditions on said surfaces for increased contact efficiency between said biological slimes and said liquid wastes and an oxygen supply;
    b. distributing liquid wastes over said filter, collecting effluent passing from said filter, and conveying said effluent to a secondary clarifier for partial settling; and
    c. withdrawing partially settled aerobic sludge from said secondary clarifier, conveying said sludge directly to said filter and distributing said sludge over said filter in a quantity sufficient to increase and maintain the solids in said filter effluent at a mixed liquor, suspended solids level in excess of about 1,500 mg./l. to promote a heavy growth of biological slimes on said surfaces in said filter whereby contact efficiency between said biological slimes, liquid wastes and oxygen is increased and the time of detention of liquid wastes within the treatment system is reduced.

2. A process for treating liquid wastes as defined in claim 1 wherein, said biological filter is selected to have a gridlike array including a plurality of horizontally and vertically spaced rows of elongate members and means formed to secure said members in fixed relation, each of said members being formed with a transverse cross section defined by an upwardly and downwardly facing pair of substantially horizontally disposed and oriented roughened surfaces and connecting vertically extending surfaces of an area less than the area of said horizontal surfaces, said upwardly facing surfaces affording an area upon which a quantity of activated solids may be stored in said filter for contact with said liquid wastes.

3. A process for treating liquid wastes as defined in claim 1 and the step of:
    maintaining the mixed liquor, suspended solids level in the filter effluent in the range of about 1,500 to about 6,000 mg./l.

4. A liquid wastes treatment process as defined in claim 1, and
    a. conveying a portion of said filter effluent directly over said filter while conveying the remainder of said filter effluent to said secondary clarifier;
    b. maintaining the total volume of said portion of said filter effluent conveyed over said filter and said sludge conveyed over said filter at a level no greater than about 2.5 times the volume of said liquid wastes distributed over said filter.

5. In a liquid wastes treatment system including a biological filter, distribution means for distribution influent in the form of liquid wastes over said filter, collecting means formed for collecting effluent from said filter, a secondary clarifier, and conduit means connecting said collecting means to said secondary clarifier for flow of filter effluent from said collecting means to said secondary clarifier, the process of treating liquid wastes comprising the steps of:
    a. employing a biological filter having a gridlike array including a plurality of horizontally spaced and vertically aligned rows of vertically spaced elongate members and means formed to secure said members in fixed space relation, each of said members being formed with a transverse cross section defined by a pair of substantially horizontally disposed and oriented roughened surfaces of substantial area and connecting vertically extending surfaces of insubstantial vertical dimension, said means further being formed and positioned so that the major portion of the downward flow of liquid wastes in said array occurs by the free fall of droplets of liquid wastes from one member to a vertically adjacent member, said vertically spaced members being positioned with the immediately vertically adjacent members in vertical alignment to form said vertically aligned rows;
    b. providing second conduit means from said secondary clarifier to said distributing means for recycling of waste materials over said filter;
    c. withdrawing aerobic sludge from said secondary clarifier and conveying the same without detention for further oxidation to said filter through said second conduit means and distributing means; and
    d. maintaining the solids in the filter effluent at a mixed liquor, suspended solids level in excess of about 1,500 mg./l.

* * * * *